United States Patent
Wansley et al.

(10) Patent No.: US 10,467,600 B2
(45) Date of Patent: Nov. 5, 2019

(54) DETERMINING ADDITIONAL TASK FEATURES FOR A TASK OF A USER

(71) Applicant: Google Inc., Mountain View, CA (US)

(72) Inventors: Andrew Theodore Wansley, San Francisco, CA (US); Amay Nitin Champaneria, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 605 days.

(21) Appl. No.: 14/459,116

(22) Filed: Aug. 13, 2014

(65) Prior Publication Data
US 2015/0356519 A1 Dec. 10, 2015

Related U.S. Application Data

(60) Provisional application No. 62/007,877, filed on Jun. 4, 2014.

(51) Int. Cl.
*G06Q 10/10* (2012.01)
*H04L 29/08* (2006.01)
(Continued)

(52) U.S. Cl.
CPC ......... *G06Q 10/1097* (2013.01); *G06Q 10/10* (2013.01); *G06Q 30/0255* (2013.01);
(Continued)

(58) Field of Classification Search
CPC ............ G06Q 10/109; G06Q 10/1097; G06Q 30/0255; G06Q 30/0267; G06Q 30/0261;
(Continued)

(56) References Cited

U.S. PATENT DOCUMENTS 7,818,317 B1* 10/2010 Emigh .................... H04W 4/02
707/724
2006/0224587 A1* 10/2006 Zamir ............... G06F 17/30867
(Continued)

FOREIGN PATENT DOCUMENTS

CN         102947845 A      2/2013

OTHER PUBLICATIONS

Migliardi, Mauro and Servetti, Alberto, "A Survey of Recent Advancement in Prospective Memory Support Systems", 2013 Seventh International Conference on Complex, Intelligent, and Software Intensive Systems, IEEE Computer Society, 594-599 (Year: 2013).*
(Continued)

*Primary Examiner* — Christine M Behncke
*Assistant Examiner* — Shelby A Turner
(74) *Attorney, Agent, or Firm* — Middleton Reutlinger

(57) ABSTRACT

Methods, apparatus and computer-readable media (transitory and non-transitory) are disclosed for determining one or more additional task features for a task of a user. In some implementations, the additional task features may be determined based on additional information from one or more sources that are distinct from the source(s) from which the task is identified or determined. The additional task features may be determined based on the additional information and based on user information that is associated with the user. For example, the additional information may define a superset of information and the additional task features may be a subset of the defined superset. The additional task features may be utilized to generate a task notification related to the task, and the task notification may be provided for presentation to the user.

16 Claims, 6 Drawing Sheets

(51) Int. Cl.
*G06Q 30/02* (2012.01)
*H04W 4/021* (2018.01)
(52) U.S. Cl.
CPC ..... *G06Q 30/0261* (2013.01); *G06Q 30/0267* (2013.01); *H04L 67/22* (2013.01); *H04W 4/021* (2013.01)
(58) Field of Classification Search
CPC ......... H04L 12/14; H04L 67/24; H04L 67/22; H04W 4/021; G06F 9/542
USPC ....................................................... 705/7.21
See application file for complete search history.

(56) References Cited

U.S. PATENT DOCUMENTS

| | | | | |
|---|---|---|---|---|
| 2009/0113346 | A1* | 4/2009 | Wickramasuriya ... | G06F 3/0481 715/825 |
| 2009/0193415 | A1 | 6/2009 | Narayanaswami et al. | |
| 2011/0314404 | A1 | 12/2011 | Kotler et al. | |
| 2012/0289254 | A1* | 11/2012 | Dishneau ........... | G06Q 10/1097 455/456.3 |
| 2013/0115927 | A1* | 5/2013 | Gruber ................ | H04W 4/16 455/414.1 |
| 2013/0275164 | A1* | 10/2013 | Gruber ................ | G10L 17/22 705/5 |
| 2014/0032678 | A1* | 1/2014 | Koukoumidis .... | G06Q 30/0255 709/205 |
| 2014/0033071 | A1* | 1/2014 | Gruber .............. | G06Q 10/1097 715/752 |
| 2014/0074615 | A1* | 3/2014 | Hope ................. | G06Q 30/0241 705/14.64 |
| 2014/0101600 | A1* | 4/2014 | Macbeth ........... | G06Q 30/0282 715/780 |
| 2014/0258270 | A1* | 9/2014 | Reese ................ | G06F 16/9535 707/722 |
| 2015/0015409 | A1* | 1/2015 | Won ....................... | G08B 21/24 340/815.4 |
| 2018/0032997 | A1* | 2/2018 | Gordon ............. | G06Q 20/3224 |

OTHER PUBLICATIONS

Migliardi, Mauro and Guadina, Marco, "Active Personal Information Manager: A System for Human Memory Support", 2011 International Conference on Complex, Intelligent, and Software Intensive Systems, IEEE Computer Society, 583-588 (Year: 2011).*
Stahl, Christopher et al: "Here and Now: A User-Adaptive and Location-Aware Task Planner", Proceedings of the International Workshop on Ubiquitous and Decentralized User Modeling UBIDEUM 2007 11th International Conference on User Modeling, UM 2007 Corfu, Jun. 1, 2007 (Jun. 1, 2007), pp. 50-61, XP055201545, Retrieved from the Internet: URL:http://people.cs.aau.dk/~dolog/pub/ubideum2007.pdf [retrieved on Jul. 10, 2015] p. 56.
International Search Report and Written Opinion of PCT Serial No. PCT/US15/33543 dated Jul. 20, 2015.
European Patent Office; Examination Report issued in Application No. 15727295.6; 6 pages; dated Sep. 12, 2018.
China National Intellectual Property Administration; Office Action issued in Application No. 201580029856.4 dated Jan. 28, 2019.
China National Intellectual Property Administration; Office action issued in Application No. 201580029856.4 dated Jul. 8, 2019.

* cited by examiner

500A →

500B →

DETERMINING ADDITIONAL TASK FEATURES FOR A TASK OF A USER

CROSS-REFERENCE TO RELATED APPLICATIONS

This application claims the benefit of U.S. Provisional Application No. 62/007,877, filed Jun. 4, 2014, which is hereby incorporated by reference in its entirety.

BACKGROUND

A user may utilize one or more applications to create a task entry related to a task of the user. For example, a user may have interest in purchasing an item and the user may create a task entry to remind the user to purchase and/or research the item.

SUMMARY

This specification is directed generally to methods and apparatus for determining one or more additional task features for a task of a user. In some implementations, the additional task features may be determined based on additional information from one or more sources that are distinct from the source(s) from which the task is identified or determined. The additional information from the distinct source(s) may be determined based on an association of the additional information with the task. The additional task features may be determined based on the additional information and based on user information that is associated with the user. For example, the additional information may define a superset of information such as a plurality of locations, activities, and/or times, and the additional task features may be a subset of the defined superset.

The additional task features may be utilized to generate a task notification related to the task, and the task notification may be provided for presentation to the user, e.g., for presentation via a computing device of the user. In some implementations, generating a task notification based on the additional task features includes determining a trigger condition for the task notification based on at least some of the additional task features. In some implementations, generating a task notification based on the additional task features may additionally or alternatively include incorporating at least some of the additional task features in content to be displayed in the task notification.

In some implementations, a computer implemented method may be provided that includes the steps of: identifying task information of a user, the task information including an action indication and an interaction entity indication, the action indication indicative of one or more actions to be performed and the interaction entity indication indicative of an interaction entity associated the one or more actions; identifying user information associated with the user, the user information being in addition to the task information and identifying at least one of: one or more attributes of the user and one or more past activities of the user; determining additional information associated with the task information in one or more additional data sources, the additional data sources non-specific to the user; determining one or more additional task features based on the additional information and based on the user information; generating a task notification based at least in part on the one or more additional task features, the task notification including information related to the task information; and providing the task notification for presentation to the user.

These methods and other implementations of technology disclosed herein may each optionally include one or more of the following features.

In some implementations, generating the task notification includes determining a trigger condition for the task notification based on the one or more additional task features. In some versions of those implementations, the method further includes determining satisfaction of the trigger condition and the providing the task notification for presentation to the user is in response to determining the satisfaction of the trigger condition. In some versions of those implementations, the one or more additional task features includes a location and the trigger condition for the task notification is based on the location.

In some implementations, generating the task notification includes incorporating at least some of the one or more additional task features in content to be displayed in the task notification.

In some implementations, the additional information identifies a plurality of potential additional task features and determining the additional task features includes: determining a subset of the potential additional task features as the additional task features based on the user information. In some versions of those implementations, determining the subset of the potential additional task features as the additional task features based on the user information includes: mapping the user information to a given additional task feature of the additional task features; and selecting the given additional task feature for inclusion in the subset based on the mapping. In some versions of those implementations, the user information mapped to the given additional task feature includes a given activity of the one or more past activities, the given activity being one of: a search query submitted by the user, a document visited by the user, and an application utilized by the user.

In some implementations, the additional information identifies a class of locations and determining the additional task features includes: determining a location that is a member of the class of locations based on the user information, and including the location in the additional task features.

In some implementations, the additional information identifies a plurality of times and determining the additional task features includes: determining a subset of the plurality of times based on the user information, and including the subset in the additional task features.

In some implementations, the additional information identifies a plurality of entities via which the task can be completed and determining the additional task features includes: determining a subset of the plurality of entities based on the user information, and including the subset in the additional task features.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The specification is generally related to methods and apparatus for determining one or more additional task features for a task of a user. In some implementations, the one or more additional task features may be utilized to determine content of, and/or trigger condition(s) for, a task notification related to the task of the user, e.g., for presentation via a computing device of the user. The task notification may be provided for presentation as, for example: a reminder of the task provided in response to one or more trigger conditions and/or as a notification of the task provided for viewing by the user (not necessarily responsive to one or more trigger conditions). The task notification may be presented via one or more applications executable by a computing device of the user such as via a personal assistant application, a calendar application, an email application, and/or a web browser application (e.g., while accessing an e-mail service, a calendar service, or other service via the web browser application).

As one example, a task of a user may be to "buy eggs" and may be represented as task information that identifies an action indication of "buy" and an interaction entity indication of "eggs" that is associated with the action indication of "buy". An additional data source that maps tasks to additional information may include a mapping that maps task information of the form "task action=[buy/purchase/pickup]; interaction entity=[grocery item]" to additional information such as "grocery store" (a location where the task may be completed). The additional information "grocery store" may be determined to be associated with the task information for "buy eggs" based on the mapping. Further, user information that indicates interaction of the user with one or more members of the class "grocery store", such as interaction with "Brand A Grocery Store Location 1" may be utilized to determine "Brand A Grocery Store Location 1" as an additional task feature for the task.

A task notification may be generated based on "Brand A Grocery Store Location 1". For example, the content of the task notification may be tailored based on "Brand A Grocery Store Location 1" by including the name of that store, operating hours of that store, a webpage link to that store, and/or directions to that store. Also, for example, the trigger condition(s) of the task notification may be tailored based on "Brand A Grocery Store Location 1". For example, a trigger condition may be based on presence of the user at or near that store, a trigger condition may be based on operating hours of that store (optionally further tailored based on other user information such as calendar information indicating when the user is free/busy, information indicating dates/times the user typically shops at that store, etc.), and/or a trigger condition may be based on viewing a webpage of that store.

Figure 1:
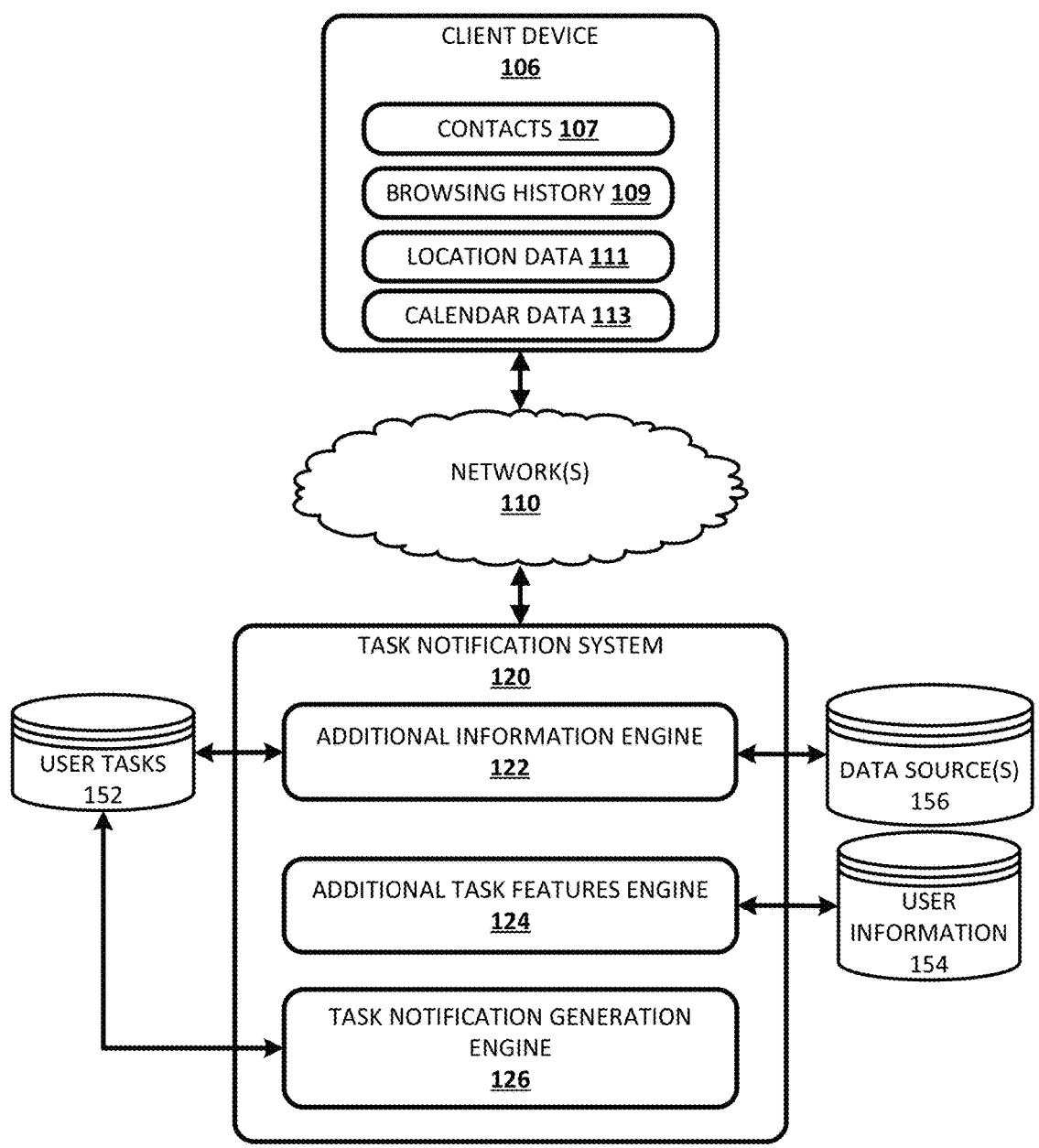
FIG. 1 illustrates an example environment in which one or more additional task features for a task of user may be determined.

FIG. 1 illustrates an example environment in which one or more additional task features for a task of user may be determined. The example environment includes a client device 106 and a task notification system 120. Task notification system 120 is an example of a system in which aspects of systems, components, and techniques described herein may be implemented and/or with which systems, components, and techniques described herein may interface.

A user may interact with task notification system 120 via client device 106 and/or other computing systems (not shown). Client device 106 may be a computer coupled to the task notification system 120 through one or more networks 110 such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. While the user likely will operate a plurality of computing devices, for the sake of brevity, examples described in this disclosure will focus on the user operating client device 106.

Client device 106 may operate one or more applications and/or components which may enable provision of task notifications to a user and/or may provide various types of information such as information related to tasks of the user, user information of the user, and/or trigger conditions related to task notifications. For example, the client device 106 may include a personal assistant application, a calendar application, an email application, and/or a browser application via which task notifications may be provided and/or via which other information may be obtained. For example, as will be described herein, client device 106 may be used to render, e.g., as output, a task notification to a user in response to one or more trigger conditions associated with the task notification.

Also, for example, the client device 106 may include a contacts component 107, a browsing history component 109, a location data component 111, and a calendar data component 113 which may provide information related to tasks of the user, user information of the user, and/or trigger conditions. At least some of the information provided by components 107, 109, 111, and/or 113 may be provided to the task notification system 120 and/or stored in user tasks database 152 and/or user information database 154 for usage by task notification system 120. Additional description of the components is provided herein. In some instances, one or more of the applications and/or components may be operated on multiple client devices operated by the user. Other components and/or applications of client device 106 not depicted in FIG. 1 may additionally and/or alternatively be utilized in techniques described herein.

Client device 106 and task notification system 120 each include one or more memories for storage of data and software applications, one or more processors for accessing data and executing applications, and other components that facilitate communication over a network. The operations performed by client device 106 and/or task notification system 120 may be distributed across multiple computer systems. Task notification system 120 may be implemented as, for example, computer programs running on one or more computers in one or more locations that are coupled to each other through a network. In some implementations, all or aspects of the task notification system 120 may be incorporated on the client device 106.

User tasks database 152 may include one or more storage mediums and may be utilized to store, modify, and/or access task information related to tasks of a user of the client device 106. In some implementations, the user tasks database 152 may store task information of multiple users and access to task information of a given user may be allowed only for the given user and/or one or more other users or components authorized by the user such as task notification system 120. In some other implementations, the user tasks database 152 may only store task information for a single user. Although user tasks database 152 is illustrated in FIG. 1 as a component separate from the client device 106, in some implementations all or aspects of user tasks database 152 may be incorporated on the client device 106. For example, some entries of user tasks database 152 may be stored only locally on the client device 106 and other entries may additionally and/or alternatively be stored remotely from the client device 106.

An entry of user tasks database 152 includes task information related to a task of a user such as an action indication and/or an interaction entity indication. An action indication of task information identifies an action that a user has interest in completing and/or having completed by one or more other users. An interaction entity indication identifies an entity that is associated with the action indication. For example, with reference to FIG. 3A, an example entry 152A of user tasks database 152 includes an action indication 152A1 of "Buy" and an interaction entity indication 152A2 of "Eggs". Also, for example, with reference to FIG. 3B, an example entry 152B of user tasks database 152 includes an action indication of "Renew" and an interaction entity indication of "Driver's License".

In some implementations, an entry of user tasks database 152 includes task information related to a task of a user and that task may be associated with multiple subtasks. The subtasks may be associated with the task in the user tasks database 152 and/or the task notification system 120 may identify the association of the task to the multiple subtasks (e.g., based on information in another database). As one example, an entry of user tasks database 152 may include an action indication of "plan" and an interaction entity indication of "party". The entry may be associated with multiple subtasks related to planning a party such as "book a venue", "book a caterer", and/or "send invites". The task notification system 120 may determine additional information, additional task features, and generate a task notification based on the task of the entry and/or one or more of the associated subtasks.

In some implementations, an action indication and/or an interaction entity indication may include an entity identifier. For example, an action indication of "buy" may include an identifier of the entity associated with the action of buying. An entity identifier may be associated with an entity in one or more databases, such as a knowledge graph or other entity database. In some implementations, an action indication and/or an interaction entity indication may additionally or alternatively include one or more terms associated with the action indication and/or interaction entity indication. For example, an indication of the task action "buy" may include the terms "buy" and/or "purchase".

In some implementations, one or more aspects of the task information of an entry of tasks database 152 may be based on input from the user (e.g., typed, spoken, or other input). For example, the entry 152A (FIG. 3A) may be created based on input provided by the user via client device 106 to create a task entry. For example, the user may input the phrase "buy eggs" via a personal assistant application, a calendar application, an email application, and/or a browser application executing on the client device 106. For example, calendar data 113 may include a "to-do list" of the user and an entry of "buy eggs" that is included in the to-do list may be stored as entry 152A.

In some implementations, one or more aspects of the task information of an entry of tasks database 152 may additionally and/or alternatively be based on other information obtained via user interactions with the client device 106 and/or user interaction with another computing device. For example, the user may submit one or more search queries via the client device 106 that relate to renewing a driver's license or view one or more Internet documents that relate to renewing a driver's license. For example, the browsing history 109 may indicate the user visited the documents and/or submitted the search queries. In some implementations a separate component, such as a search system may provide information related to submitted queries and/or viewed documents (e.g., based on a record of query submissions for a user and selections of search results for those query submissions). The entry 152B (FIG. 3B) may be created based on the search queries and/or viewed internet documents. For example, in some implementations a system such as task notification system 120 may receive and/or identify one or more entities associated with the queries and/or Internet documents and determine, based on those entities, that the user has interest in completing a task to renew a driver's license. Such a system may automatically create an entry based on such information, or may prompt the user before creating the entry.

User information database 154 may include one or more storage mediums and may be utilized to store, modify, and/or access user information of a user of the client device 106. In some implementations, the user information database 154 may store task information of multiple users and access to task information of a given user may be allowed only for the given user and/or one or more other users or components authorized by the user such as task notification system 120. In some other implementations, the user information database 154 may only store task information for a single user. Although user information database 154 is illustrated in FIG. 1 as a component separate from the client device 106, in some implementations all or aspects of user information database 154 may be incorporated on the client device 106. For example, some entries of information database 154 may be stored only locally on the client device 106 and other entries may additionally and/or alternatively be stored remotely from the client device 106.

An entry of user information database 154 includes user information associated with a user that is in addition to the task information of the user in user tasks database 152. In some implementations, the user information identifies at least one of: one or more attributes of the user, and one or more past activities of the user. Attributes of a user may include one or more latent types that have no natural interpretation, or may be semantically meaningful types. For example, attributes of a latent type may include attributes that identify the user as a member of "group A", "group B", and/or "group C". Also, for example, attributes of a semantically meaningful type may include attributes that identify the user as being of a certain age range (e.g., teenager, retiree), as being associated with a certain area (e.g., associated with a "home" and/or "work" address, neighborhood, zip code, and/or region), and/or as having certain preferences (e.g., preferring "local" retailers, preferring "online" retailers). Additional and/or alternative attributes may be defined for a user, optionally with greater or lesser degrees of granularity than those described herein.

Past activities of the user may include, for example, one or more documents viewed by the user via a computing device such as client device 106 (e.g., as indicated by browsing history 109), one or more applications accessed by the user via a computing device such as client device 106, contacts created by the user via a computing device such as client device 106 (e.g., as indicated by contacts 107), calendar entries created by the user via a computing device such as client device 106 (e.g., as indicated by calendar data 113), and/or one or more physical locations visited by the user (e.g., as indicated by location data 111). Additional and/or alternative past activities may be identified for a user in user information database 154.

In some implementations, one or more aspects of the user information of an entry of user information database 154 may be based on input from the user. For example, a home address attribute of the user may be based on input provided by the user via client device 106. In some implementations, the user information of an entry of user information database 154 may additionally and/or alternatively be based on other information obtained via user interactions with the client device 106 and/or other computing device. For example, one or more aspects of the user information may be based on contacts 107, browsing history 109, location data 111, and/or calendar data 113.

Data source 156 may include one or more databases in one or more storage mediums and may be utilized to store, modify, and/or access additional information related to tasks. In some implementations, the data source 156 may include a database that maps each of a plurality of tasks with additional information associated with the task. In some implementations, the data source 156 may include, or be restricted to, data that is not specific to the user of client device 106. For example, the data source 156 may include a database that maps tasks with additional information associated with tasks for a collection of users, such as a global database for all users or users of a specific geographic area. Additional information for a task may identify, for example: one or more entities via which the task may be completed; one or more steps related to completion of the task; one or more links, documents, search queries, etc. related to the task; one or more times or dates associated with the task; and/or one or more trigger conditions that may be relevant to the task. For example, with reference to FIG. 3A, an example entry 156A of data source 156 identifies tasks having actions 156A1 of "<Purchase Actions>" and interaction entities 156A2 of "<Grocery Items>". Thus, the example entry 156A relates to all tasks with a purchase action indication such as "purchase" or "buy" and that include a grocery item interaction entity indication such as "milk", "eggs", or "bananas". The example entry 156A also includes additional information "<Grocery Store>" that indicates an entity via which the tasks indicated by 156A1 and 156A2 may be completed. Also, for example, with reference to FIG. 3B, an example entry 156B of data source 156 includes a task 152B of "Renew Driver's License" that is associated with additional information 156B1 that is related to renewing a driver's license in the state of California and additional information 156B2 that is related to renewing a driver's license in the state of Oklahoma. As indicated by the ellipsis between 156B1 and 156B2, the task 152B may be associated with more additional information such as additional information for each of a plurality of additional states.

Various techniques may be utilized to create and/or maintain data source 156. For example, in some implementations one or more entries of data source 156 may be manually curated. Also, for example, in some implementations one or more entries of data source 156 may be determined and/or updated based on feedback provided by users related to completion of tasks by the users. Also, for example, in some implementations one or more entries of data source 156 may be determined and/or updated based on automated and/or manual processes that review aggregate records related to documents, locations, searches, and/or other information related to a task to determine additional information for the task.

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

Generally, the task notification system 120 determines one or more additional task features for a task of a user utilizing one or more techniques described herein. In some implementations, the task notification system 120 utilizes the additional task features to generate a task notification related to the task and provides the task notification for presentation to the user. In various implementations, task notification system 120 may include an additional information engine 122, an additional task features engine 124, and a task notification generation engine 126. In some implementations one or more of engines 122, 124, and/or 126 may be omitted. In some implementations all or aspects of one or more of engines 122, 124, and/or 126 may be combined. In some implementations, one or more of engines 122, 124, and/or 126 may be implemented in a component that is separate from task notification system 120. In some implementations, one or more of engines 122, 124, and/or 126, or any operative portion thereof, may be implemented in a component that is executed by client device 106.

Additional information engine 122 may be configured to determine additional information associated with task information of a user in one or more sources. For example, additional information engine 122 may match task information for a task of a user e.g., received from user tasks database 152 or client device 106, to additional information associated with the task in data source 156. In some implementations, data source 156 may include, or be restricted to, data that is not specific to the user of client device 106. For example, the data source 156 may include a database that maps tasks with additional information associated with tasks for a collection of users, such as a global database for all users or users of a specific geographic area.

Figure 3A:
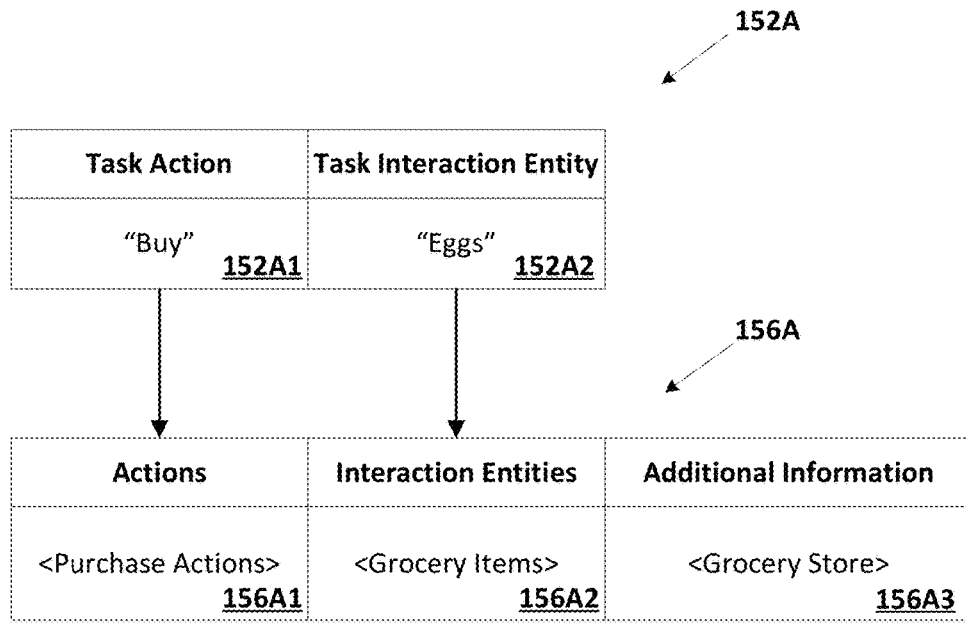
FIG. 3A illustrates an example of a mapping between task information and additional information.

As one example, with reference to FIG. 3A, an example entry 152A of user tasks database 152 includes an action indication 152A1 of "Buy" and an interaction entity indication 152A2 of "Eggs". The additional information engine 122 may match the example entry 152A to an example entry 156A of data source 156 that identifies tasks having actions 156A1 of "<Purchase Actions>" and interaction entities 156A2 of "<Grocery Items>". For example, the additional information engine 122 may determine the action indication 152A1 of "Buy" is a member of the actions 156A1 of "<Purchase Actions>" and determine the interaction entity indication 152A2 of "Eggs" is a member of the interaction entities 156A2 of "<Grocery Items>". The additional information engine 122 may further determine the additional information 156A3 of entry 156A as additional information for the entry 152A. As described, the additional information 156A3 "<Grocery Store>" indicates a class of entities via which the tasks indicated by 156A1 and 156A2 may be completed.

Additional task features engine 124 may be configured to determine one or more additional task features based at least in part on the additional information and based on user information associated with a user. For example, the additional information engine 122 may determine additional information that defines a superset of additional information and the additional task features engine 124 may determine a subset of that information as additional task features based on user information database 154 associated with a user. In some implementations, the user information identifies at least one of: one or more attributes of the user, and one or more past activities of the user. In some implementations, the additional information may identify a class of information and the additional task features engine 124 may determine one or more members of the class as the additional task features based on the user information database 154. In some implementations, the additional information may identify a plurality of additional information items and the additional task features engine 124 may determine a subset of the plurality of additional information items based on the user information database 154.

As one example, a task of a user may be to "buy eggs" and additional information engine 122 may determine the additional information 156A3 "<Grocery Store>" is associated with the task information for "buy eggs" as described above. The additional task features engine 124 may determine one or more additional task features based on the additional information 156A3 "<Grocery Store>" and based on user information database 154. For example, user information that indicates interaction of the user with one or more members of the class "grocery store" may be utilized to select those one or more members as additional task features. For example, user information that indicates interaction of the user with "Brand A Grocery Store Location 1" may be utilized to determine "Brand A Grocery Store Location 1" as an additional task feature. The user information may include, for example, location data indicating presence of the user at that store, contacts indicating that store as a contact of the user, and/or browsing history indicating viewing of webpages related to that store. Also, for example, user information that may indicate interaction of the user with an online delivery service such as visits to the webpage for the service, use of an application of the service, and/or searches related to the service may be utilized to select the online delivery service as an additional task feature.

In some implementations where user information indicates interaction with multiple members of a class, one or more members of that class may be selected based on a score or other signal that indicates the strength of association of the member with the user. For example, where the user information indicates interaction with both the online delivery service and "Brand A Grocery Store Location 1", one of those may be selected that has a score or other signal that indicates the greatest strength of association with the user. A score that indicates the strength of association of a member with a user may be based on one or more factors. For example, the score for a member may take into account the quantity of indicated interactions with the member, the frequency of indicated interactions with the member, the recency of indicated interactions with the member, and/or the quantity and/or type sources of the indicated interactions with the member. For example, location data indicating interaction with a member may be weighted more heavily than browsing history indicating interaction with a member. Also, for example, location data indicating interaction with a member standing alone may be less indicative of strength of association with the member than location data and browsing history both indicating interaction with a member.

Task notification generation engine 126 may be configured to generate a task notification related to the task and provide the task notification for presentation to the user, e.g., for presentation via a computing device of the user. In some implementations, generating a task notification based on the additional task features includes determining a trigger condition for the task notification based on at least some of the additional task features. In some implementations, generating a task notification based on the additional task features may additionally or alternatively include incorporating at least some of the additional task features in content to be displayed in the task notification.

Generally, trigger conditions for a task notification identify one or more conditions that indicate it may be appropriate to present the task notification to the user. Trigger conditions may be based on, for example, one or more times, one or more dates, one or more locations, co-presence of the user with one or more individuals, and/or one or more activities of the user via the computing device (e.g., accessing certain applications, accessing certain documents, searching for certain terms). Some examples of trigger conditions are described in more detail herein. In some implementations, satisfaction of any one of one or more (e.g., any) trigger condition of a plurality of trigger conditions for a task notification may result in the task notification being presented to the user. In some implementations, multiple trigger conditions (e.g., all) must be satisfied before a task notification is presented to the user.

Figure 5A:
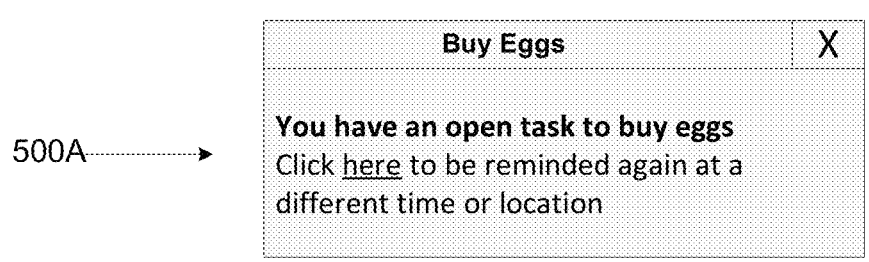
FIG. 5A illustrates an example of a task notification that may be presented to a user.
Figure 5B:
FIG. 5B illustrates another example of a task notification that may be presented to a user.

Task notification generation engine 126 may provide the task notification for presentation as, for example: a reminder of the task provided in response to one or more trigger conditions and/or as a notification of the task provided for viewing by the user (not necessarily responsive to one or more trigger conditions). The task notification may be presented via one or more applications executable by a computing device of the user such as via a personal assistant application, a calendar application, an email application, and/or a web browser application (e.g., while accessing an e-mail service, a calendar service, or other service via the web browser application). Non-limiting examples of task notifications that may be presented to a user are illustrated in FIGS. 5A and 5B and described in more detail herein. In some implementations, the task notification generation engine 126 may provide the task notification to the client device 106, including trigger conditions for the task notification, and the client device 106 may monitor for occurrence of one or more of the trigger conditions and present the task notification to the user based on the occurrence of the trigger conditions. In some implementations, the task notification generation engine 126 may monitor for occurrence of one or more of the trigger conditions and provide the task notification, to the client device 106 based on the occurrence of the trigger conditions.

As one example, continuing with the example described above with respect to additional task features engine 124, both the online delivery service and "Brand A Grocery Store Location 1" may be selected as additional task features for the task "buy eggs" and one or more task notifications may be generated based on both. For example, a task notification may include content related to both the online delivery service and "Brand A Grocery Store Location 1". Also, for example, the trigger conditions for the task notification may be based on both the online delivery service and "Brand A Grocery Store Location 1". For example, trigger conditions may include presence at or near "Brand A Grocery Store Location 1" and may also include accessing an application, issuing a search, or accessing a document associated with the online grocery store. As one example, as illustrated in FIG. 5A, a task notification 500A may include content of "Buy Eggs" and identify the user has an open task to buy eggs. The task notification generation engine 126 may determine one or more trigger conditions for the task notification 500A based on the additional task features. For example, trigger conditions may include presence at or near "Brand A Grocery Store Location 1" and may also include accessing an application, issuing a search, or accessing a document associated with the online grocery store.

Figure 2:
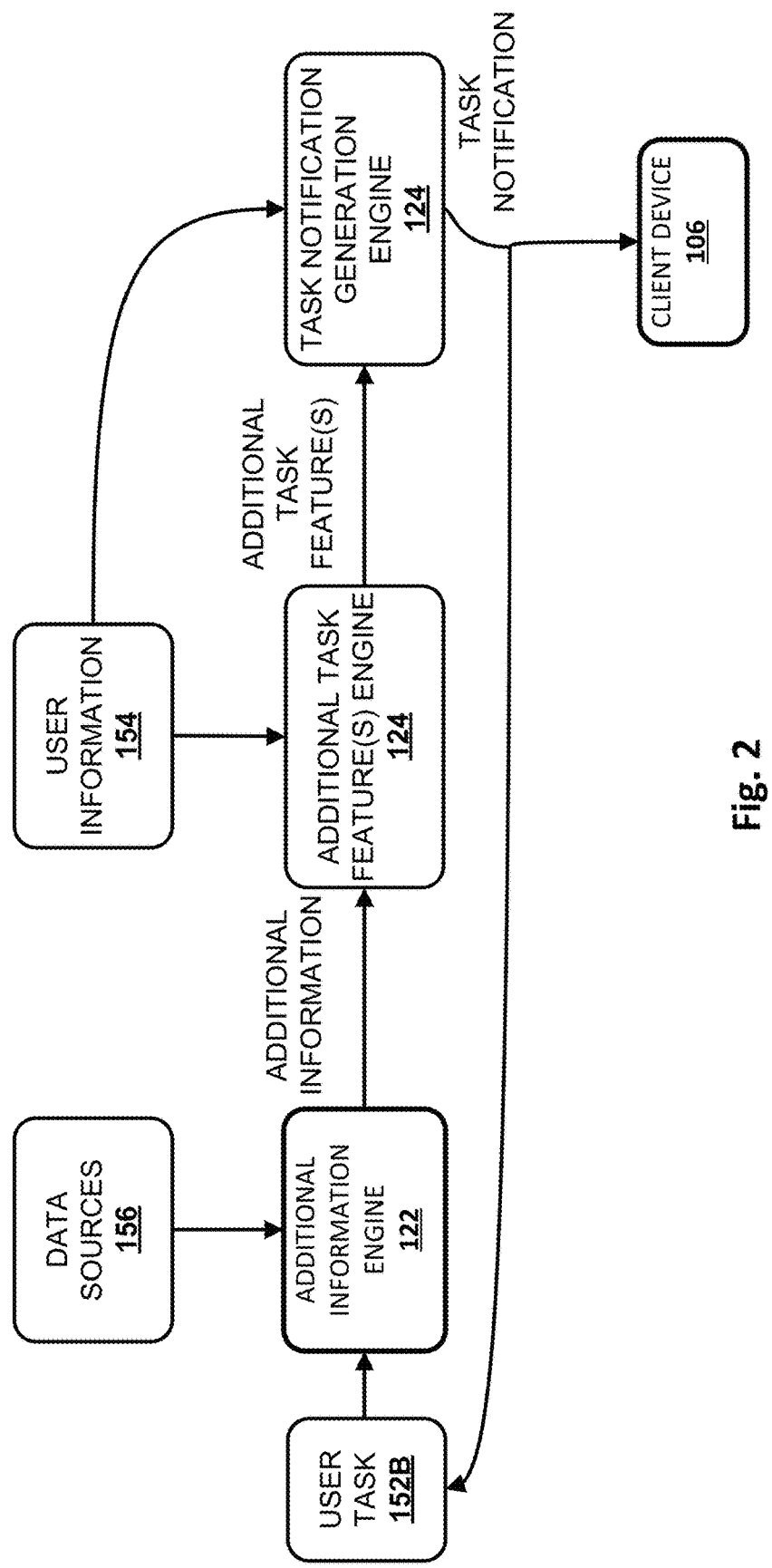
FIG. 2 illustrates one example of how a task notification may be generated based on one or more additional task features for a task of a user.
Figure 3B:
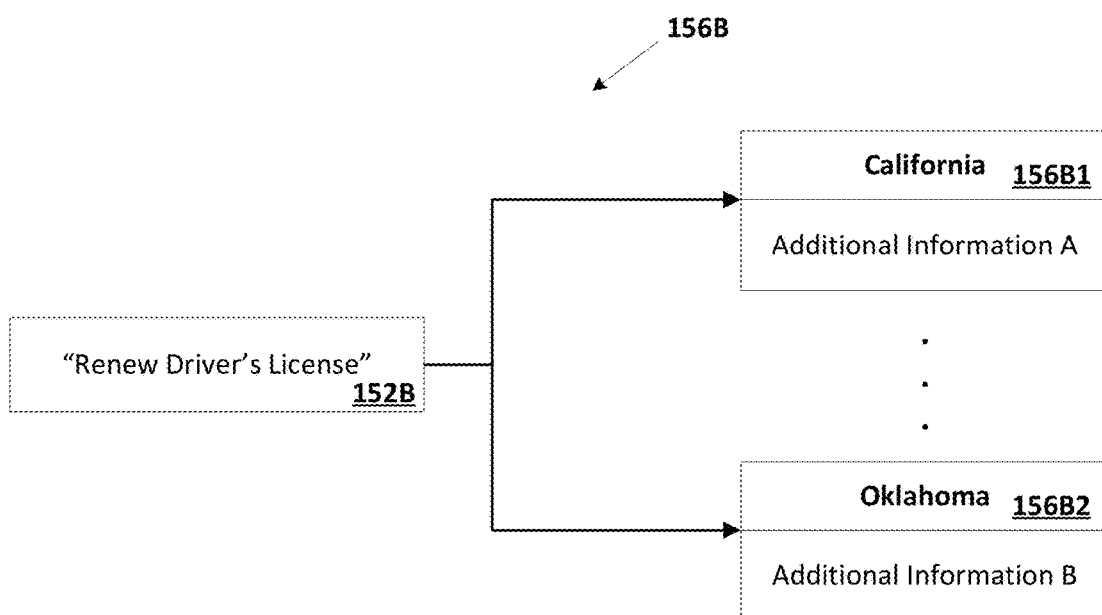
FIG. 3B illustrates another example of a mapping between task information and additional information.

FIG. 2 schematically depicts one example of how a task notification may be generated based on one or more additional task features for a task of a user. In FIG. 2, user task 152B (FIG. 3B) is identified from user tasks database 152 by task notification system 120. However, this is not meant to be limiting. For example, in some implementations a task of a user may be received directly from client device 106 and/or other source. As illustrated in FIG. 3B, task 152B is a task to "renew my driver's license" and may be represented as task information that identifies an action indication of "renew" and an interaction entity indication of "driver's license" that is associated with the action indication of "renew".

Additional information engine 122 may access data source 156 to determine additional information associated with the user task 152B. For example, as illustrated in FIG. 3B, additional data source 156 may include an entry 156B that maps task information of the form "Renew Driver's License" to a first set of additional information 156B1 associated with the state of California, a second set 156B2 associated with the state of Oklahoma, etc. The multiple sets of additional information may be provided as additional information to additional task features engine 124.

The additional task features engine 124 may access user information database 154 to determine a subset of the additional information as additional task features for the user task 152B. For example, the additional task features engine 124 may identify a user attribute from user information database 154 that indicates the user resides in California. Based on identifying the user resides in California, the additional task features engine 124 may select the first set of additional information 156B1 as additional task features for the user task 152B. The additional task features may include, for example, a webpage identification that indicates a webpage that includes information related to renewal of a driver's license in California and includes a listing of the multiple physical locations where a driver's license may be renewed. In some implementations, the additional task features engine 124 may further select only a subset of the multiple physical locations where a driver's license may be renewed based on the user information database 154. For example, the user information database 154 may identify a current location of the user, a home location of the user, and/or a work location of the user and the subset may be selected based on proximity to one or more of those locations. Also, for example, the user information database 154 may identify one or more times and/or dates during which the user is available and/or during which the user typically performs errands or other tasks and the subset may be selected based on the physical locations of the subset being open during those times/dates.

In some implementations, as described herein, the task notification generation engine 126 may additionally and/or alternatively select a subset of the multiple physical locations based on user information database 154. For example, the task notification generation engine 126 may dynamically update a task notification based on a current location of the user to reflect the closest physical location where a driver's license may be renewed. In some implementations, additional and/or alternative additional information may be included in the additional information 156B1 and optionally selected by the additional task features engine 124 as additional task features. For example, the additional information may include instructions and/or costs for renewing a driver's license in California. Also, for example, the additional information may include prerequisite materials for performing the task. For example, the additional information may indicate that for renewing a driver's license in California, two forms of identification are needed. Also, for example, the additional information may include an indication of an amount of time to complete the task. In some implementations, the amount of time may be an average amount of time based on historical data. In some implementations, indications of multiple amounts of time may be provided, with each amount of time associated with one or more time periods. For example, for renewing a driver's license in California, a first indication may be that on Thursday mornings the average time to renew a driver's license is 23 minutes, whereas on Friday afternoons the average time to renew a driver's license is 45 minutes (e.g., due to longer lines).

The additional task features determined by the additional task features engine 124 may be provided to the task notification generation engine 126. The task notification generation engine 126 may generate a task notification related to the task and provide the task notification for presentation to the user, e.g., for presentation via client device 106. For example, the task notification generation engine 126 may generate a task notification that includes content related to the initially identified task entry "renew driver's license" and additionally includes content related the determined additional task features. For example, as illustrated in FIG. 5B, a task notification 500B may include content of "Renew Driver's License" and also include content that identifies the closest place to the user to renew the driver's license and content that identifies a webpage where information related to driver's license renewal can be found.

Also, for example, the task notification generation engine 126 may determine one or more trigger conditions for the task based on the additional task features. For example, the trigger conditions may be based on proximity of the user (e.g., as indicated by location data 111) to one or more of the locations where the driver's license may be renewed as indicated in the additional task features. Also, for example, the trigger conditions may be based on times when the locations where the driver's license may be renewed are open as indicated in the additional task features. For instance, the task notification may only be provided when the user is within a threshold distance of one of the locations where the driver's license may be renewed and the current time is a time when the location is open. Also, for example, the trigger conditions may be based on an amount of time for renewing the driver's license as indicated in the additional task features. For instance, the task notification may only be provided when the user has enough time to renew the driver's license (e.g., as indicated by the user's calendar and/or other user information). Also, for example, the trigger conditions may be based on user information that indicates the user is likely currently in possession of one or more prerequisite materials for performing a task.

As described, in some implementations the task notification system 156 may generate and/or dynamically update content of a task notification based on user information database 154. For example, in some implementations the task notification generation engine 126 may dynamically update the task notification 500B based on a current location of the user to reflect the currently closest physical location where a driver's license may be renewed. Also, for example, the task notification generation engine 126 may dynamically update the trigger conditions for the task notification 500B to exclude triggering of the task notification 500B during certain times when user information database 154 indicates conflicts may exist. For example, user information may indicate the user has an appointment during a certain time period (e.g., based on calendar component 113) and the trigger conditions may be updated to not trigger the task notification 500B during that time period and/or for an amount of time before that time period (e.g., for an amount of time determined based on an amount of time for renewing the driver's license as indicated in the additional task features).

The task notification generation engine 126 may provide the task notification to client device 106 and/or for storage with user task 152B in tasks database 152. In some implementations, the task notification generation engine 126 may provide the task notification for presentation as, for example: a reminder of the task provided in response to one or more trigger conditions. The task notification may be presented via one or more applications executable by client device 106 such as via a personal assistant application, a calendar application, an email application, and/or a web browser application (e.g., while accessing an e-mail service, a calendar service, or other service via the web browser application). In some implementations, the task notification generation engine 126 may provide the task notification to the client device 106, including trigger conditions for the task notification, and the client device 106 may monitor for occurrence of one or more of the trigger conditions and present the task notification to the user based on the occurrence of the trigger conditions. In some implementations, the task notification generation engine 126 may monitor for occurrence of one or more of the trigger conditions and provide the task notification, to the client device 106 based on the occurrence of the trigger conditions. The task notification may be rendered in various audio and/or visual forms. For instance, a user may be provided with a pop-up notification on a touch screen of client device 106, or client device 106 may render an audible tone or other sound to serve to remind the user of something.

Figure 4:
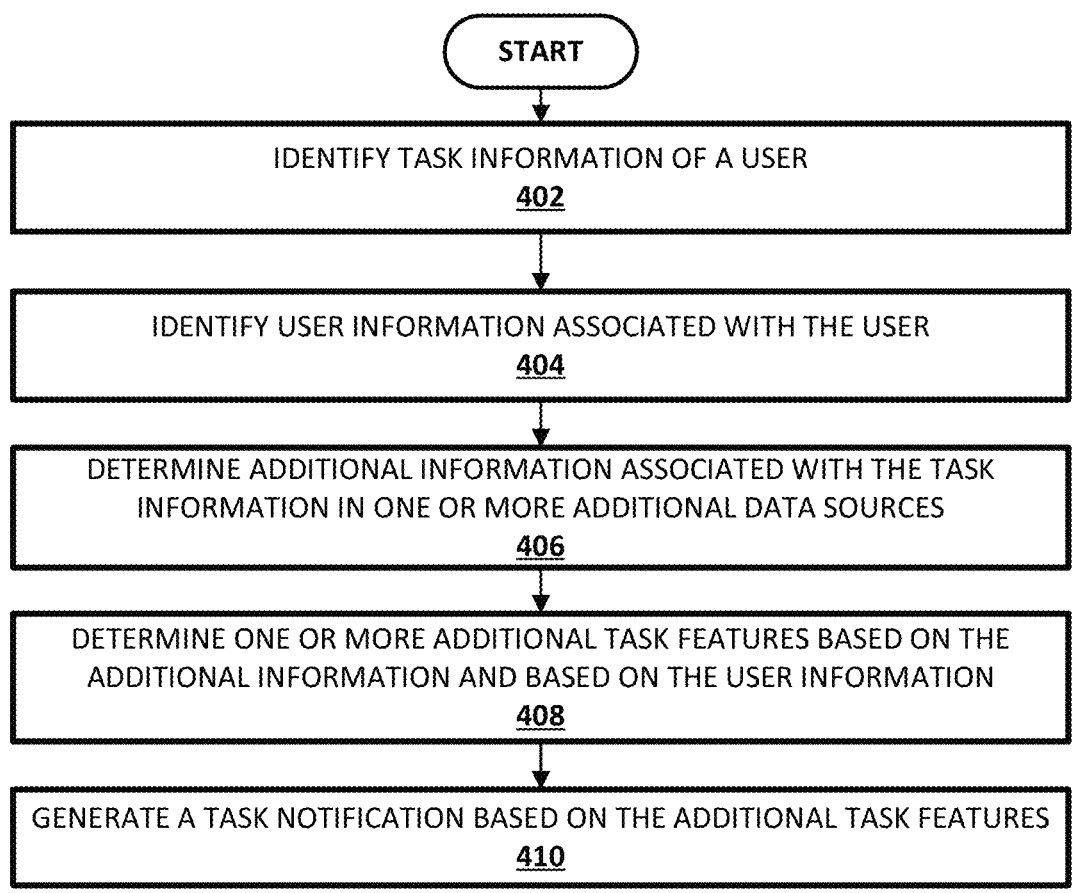
FIG. 4 is a flow chart illustrating an example method of determining additional task features for a task of a user.

FIG. 4 schematically depicts an example method of determining additional task features for a task of a user. For convenience, the operations of the flow chart are described with reference to a system that performs the operations. This system may include various components of various computer systems. For instance, some operations may be performed at the client device 106, while other operations may be performed by one or more components of the task notification system 120. Moreover, while operations of the method are shown in a particular order in FIG. 4, this is not meant to be limiting. One or more operations may be reordered, omitted or added.

At block 402, the system may identify task information of a user. For example, task notification system 120 may identify task information from user tasks database 152. However, this is not meant to be limiting. For example, in some implementations a task of a user may be received directly from client device 106 and/or another source.

At block 404, the system may identify user information associated with the user. For example, the additional information engine 122 may determine one or more aspects of user information database 154 associated with a user. In some implementations, the user information is in addition to the task information identified at block 402 and identifies at least one of: one or more attributes of the user, and one or more past activities of the user.

At block 406, the system may determine additional information associated with the task information in or more additional data sources. For example, additional information engine 122 may access data source 156 to determine additional information associated with the task information identified at block 402. For example, additional information engine 122 may match task information of block 402 to additional information associated with the task information in data source 156. In some implementations, data source 156 may include, or be restricted to, data that is not specific to the user of client device 106. For example, the data source 156 may include a database that maps tasks with additional information associated with tasks for a collection of users, such as a global database for all users or users of a specific geographic area.

At block 408, the system may determine one or more additional task features based on the additional information (block 406) and the user information (block 404). For example, the additional information may define a superset of additional information and the additional task features engine 124 may determine a subset of that information as additional task features based on user information database 154 associated with a user. In some implementations, the additional information may identify a class of information and the additional task features engine 124 may determine one or more members of the class as the additional task features based on the user information database 154. In some implementations, the additional information may identify a plurality of additional information items and the additional task features engine 124 may determine a subset of the plurality of additional information items based on the user information database 154.

At block 410, a task notification is generated based on the additional task features determined at block 408. For example, task notification generation engine 126 may generate the task notification. In some implementations, generating a task notification based on the additional task features includes determining a trigger condition for the task notification based on at least some of the additional task features. In some implementations, generating a task notification based on the additional task features may additionally or alternatively include incorporating at least some of the additional task features in content to be displayed in the task notification. Task notification generation engine 126 may provide the task notification for presentation as, for example: a reminder of the task provided in response to one or more trigger conditions and/or as a notification of the task provided for viewing by the user (not necessarily responsive to one or more trigger conditions). The task notification may be presented via one or more applications executable by a computing device of the user.

Figure 6:
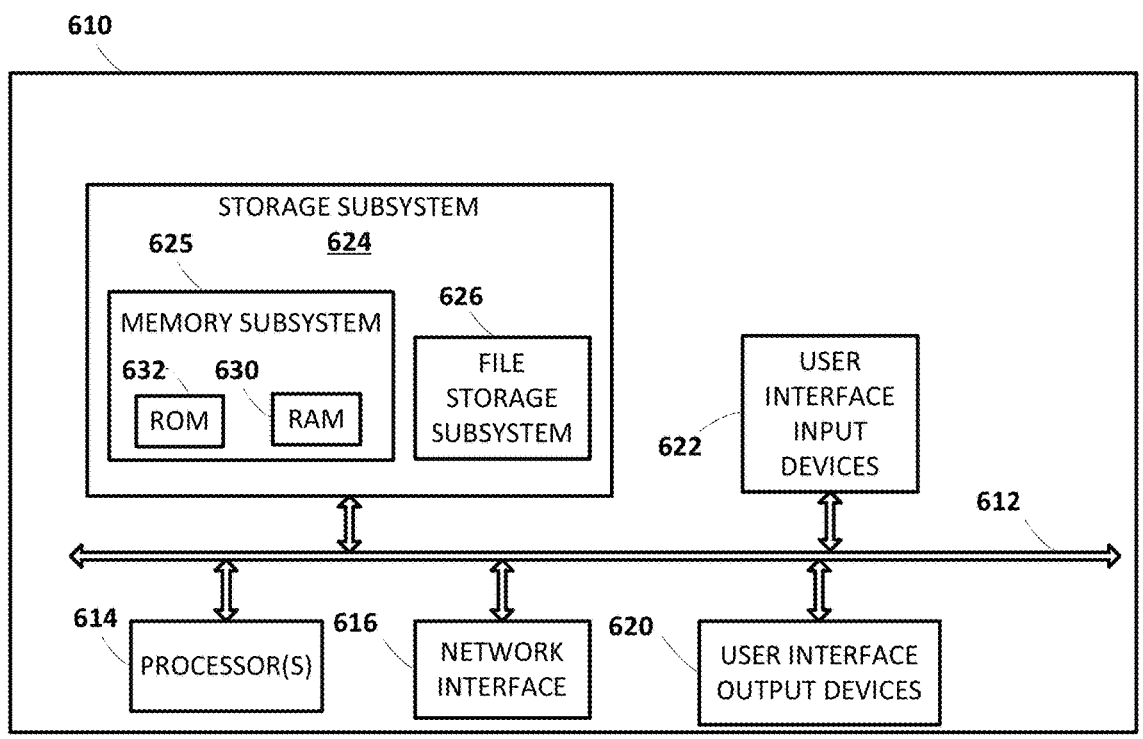
FIG. 6 illustrates an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of the method of FIG. 4, as well as one or more of the operations performed by additional information engine 122, additional task features engine 124, task notification generation engine 126, and so forth.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
identifying task information of a user, the task information including an action indication and an interaction entity indication, the action indication indicative of one or more actions to be performed and the interaction entity indication indicative of an interaction entity associated with the one or more actions;
identifying user information associated with the user, the user information being in addition to the task information and identifying at least one of: one or more attributes of the user and one or more past activities of the user;
determining additional information associated with the task information in one or more additional data sources, the additional data sources non-specific to the user, and the additional information identifying a plurality of entities that conform to the interaction entity indication and via which the one or more actions can be completed;
determining one or more additional task features based on the additional information and based on the user information, wherein determining the one or more additional task features includes:
determining a given entity, from the additional information identifying the plurality of entities that conform to the interaction entity indication, based on the user information, the given entity being a merchant located at a physical location, and
including the given entity in the additional task features;
generating a task notification based at least in part on the one or more additional task features, the task notification including information related to the task information, wherein generating the task notification based at least in part on the one or more additional task features includes:
tailoring content, of the task notification, to the given entity determined based on the user information, wherein tailoring the content to the given entity comprises including, in the content of the task notification, a selectable link associated with the given entity, and
determining one or more trigger conditions for providing the task notification,
wherein the one or more trigger conditions for providing the task notification include performance, by the user via interaction with a computing device of the user, of one or more activities that are associated with the given entity determined based on the user information, and
wherein the activities include the user accessing an application associated with the given entity; and
subsequent to generating the task notification:
monitoring for occurrence of the one or more trigger conditions that are associated with the given entity;
based on the monitoring, determining satisfaction of the one or more trigger conditions that are associated with the given entity, wherein determining the satisfaction of the one or more trigger conditions includes determining the performance, of the one or more activities of the trigger conditions, via the interaction with the computing device by the user; and
in response to determining the satisfaction of the one or more trigger conditions, providing the task notification for presentation to the user via the computing device, including providing the content tailored to the given entity determined based on the user information,
wherein providing the task notification for presentation comprises providing the task notification via at least one of: a pop-up notification on a graphical user interface of the computing device of the user, and the application associated with the given entity.

2. The method of claim 1, wherein determining the given entity based on the user information includes:
mapping the user information to the given entity; and
selecting the given entity for inclusion in a subset based on the mapping.

3. The method of claim 2, wherein the user information mapped to the given entity includes a given activity of the one or more past activities, the given activity being one of: a search query submitted by the user, a document visited by the user, and an application utilized by the user.

4. The method of claim 1, wherein the additional information further identifies a plurality of times and determining the one or more additional task features further includes:
determining a subset of the plurality of times based on the user information, and including the subset in the additional task features.

5. The method of claim 1, wherein the one or more activities of the trigger conditions further include issuing a search query associated with the given entity.

6. The method of claim 1, wherein determining the additional task features further comprises:
identifying given entity temporal information associated with the given entity; and
wherein the one or more trigger conditions further include a time period that is based on comparison of stored temporal information of the user to the given entity temporal information, the stored temporal information of the user indicating when the user is free and when the user is busy.

7. The method of claim 6, wherein the given entity temporal information indicates an amount of time to complete the one or more actions at the physical location, the given entity temporal information being determined based on historical data.

8. The method of claim 1, wherein determining the given entity based on the user information further comprises: selecting the given entity in lieu of one or more other entities of the plurality of entities based on a recency of an indicated interaction of the user with the given entity, the indicated interaction of the user with the given entity being based on location data that indicates presence of the user at the physical location.

9. The method of claim 1, wherein identifying the task information of the user is based on the user submitting, via the computing device or one or more additional computing devices, one or more past search queries related to the task information.

10. The method of claim 1, wherein the one or more trigger conditions further include:
a temporal trigger condition determined based on operating hours of the given entity and based on times of past interactions of the user with the given entity.

11. The method of claim 1, wherein determining the given entity based on the user information comprises: selecting the given entity in lieu of one or more other entities of the plurality of entities based on multiple interactions of the user with the given entity, the multiple interactions including interactions based on location data and interactions based on browsing history, and selecting the given entity based on the multiple interactions including selecting the given entity based on a quantity of the multiple interactions.

12. The method of claim 1, wherein determining the given entity based on the user information comprises: selecting the given entity in lieu of one or more other entities of the plurality of entities based on the given entity being included as a contact of the user in the user information.

13. A system including memory and one or more processors operable to execute instructions stored in the memory, comprising instructions to:
identify task information of a user, the task information including an action indication and an interaction entity indication, the action indication indicative of one or more actions to be performed and the interaction entity indication indicative of an interaction entity associated with the one or more actions;
identify user information associated with the user, the user information being in addition to the task information and identifying at least one of: one or more attributes of the user and one or more past activities of the user;
determine additional information associated with the task information in one or more additional data sources, the additional data sources non-specific to the user, and the additional information identifying a plurality of entities that conform to the interaction entity indication and via which the one or more actions can be completed;
determine one or more additional task features based on the additional information and based on the user information, wherein the instructions to determine the one or more additional task features include instructions to:
determine a given entity, from the additional information identifying the plurality of entities that conform to the interaction entity indication, based on the user information, the given entity being a merchant located at a physical location, and
include the given entity in the additional task features;
generate a task notification based at least in part on the one or more additional task features, the task notification including information related to the task information, wherein the instructions to generate the task notification based at least in part on the one or more additional task features include instructions to:
tailor content, of the task notification, to the given entity determined based on the user information, and
determine one or more trigger conditions for providing the task notification,
wherein the one or more trigger conditions for providing the task notification include performance, by the user via interaction with a computing device of the user, of one or more activities that are associated with the given entity determined based on the user information, and
wherein the activities include the user accessing an application associated with the given entity;
subsequent to generation of the task notification:
monitor for occurrence of the one or more trigger conditions that are associated with the given entity;
determine, based on the monitoring, satisfaction of the one or more trigger conditions that are associated with the given entity, wherein the instructions to determine the satisfaction of the one or more trigger conditions include instructions to determine the performance, of the one or more activities of the trigger conditions, via the interaction with the computing device by the user; and
in response to determining the satisfaction of the one or more trigger conditions, provide the task notification, with the content, for presentation to the user via the computing device,
wherein the instructions to provide the task notification for presentation comprise instructions to provide the task notification via at least one of: a pop-up notification on a graphical user interface of the computing device of the user, and the application associated with the given entity.

14. The system of claim 13, wherein the instructions to determine the given entity based on the user information include instructions to:
map the user information to the given entity; and
select the given entity for inclusion in a subset based on the mapping.

15. The system of claim 14, wherein the user information mapped to the given entity includes a given activity of the one or more past activities, the given activity being one of: a search query submitted by the user, a document visited by the user, and an application utilized by the user.

16. A non-transitory computer-readable medium comprising instructions that, in response to execution of the instructions by a computing system, cause the computing system to perform operations comprising:
identifying task information of a user, the task information including an action indication and an interaction entity indication, the action indication indicative of one or more actions to be performed and the interaction entity indication indicative of an interaction entity associated with the one or more actions;
identifying user information associated with the user, the user information being in addition to the task information and identifying at least one of: one or more attributes of the user and one or more past activities of the user;
determining additional information associated with the task information in one or more additional data sources, the additional data sources non-specific to the user, and the additional information identifying a plurality of entities that conform to the interaction entity indication and via which the one or more actions can be completed;
determining one or more additional task features based on the additional information and based on the user information, wherein determining the one or more additional task features includes:
determining a given entity, from the additional information identifying the plurality of entities that conform to the interaction entity indication, based on the user information, the given entity being a merchant located at a physical location, and
including the given entity in the additional task features;
generating a task notification based at least in part on the one or more additional task features, the task notification including information related to the task information, wherein generating the task notification based at least in part on the one or more additional task features includes:
tailoring content, of the task notification, to the given entity determined based on the user information, and
determining one or more trigger conditions for providing the task notification,
wherein the one or more trigger conditions for providing the task notification include performance, by the user via interaction with a computing device of the user, of one or more activities that are associated with the given entity determined based on the user information, and wherein the activities include the user accessing an application associated with the given entity; and subsequent to generating the task notification:
monitoring for occurrence of the one or more trigger conditions that are associated with the given entity;

based on the monitoring, determining satisfaction of the one or more trigger conditions that are associated with the given entity, wherein determining the satisfaction of the one or more trigger conditions includes determining the performance, of the one or more activities of the trigger conditions, via the interaction with the computing device by the user; and in response to determining the satisfaction of the one or more trigger conditions, providing the task notification for presentation to the user via the computing device, including providing the content tailored to the given entity determined based on the user information, wherein providing the task notification for presentation comprises providing the task notification via at least one of: a pop-up notification on a graphical user interface of the computing device of the user, and the application associated with the given entity.

* * * * *